Nov. 6, 1928.
E. W. JACKSON
BEACON
Filed Jan. 29, 1926
1,691,011
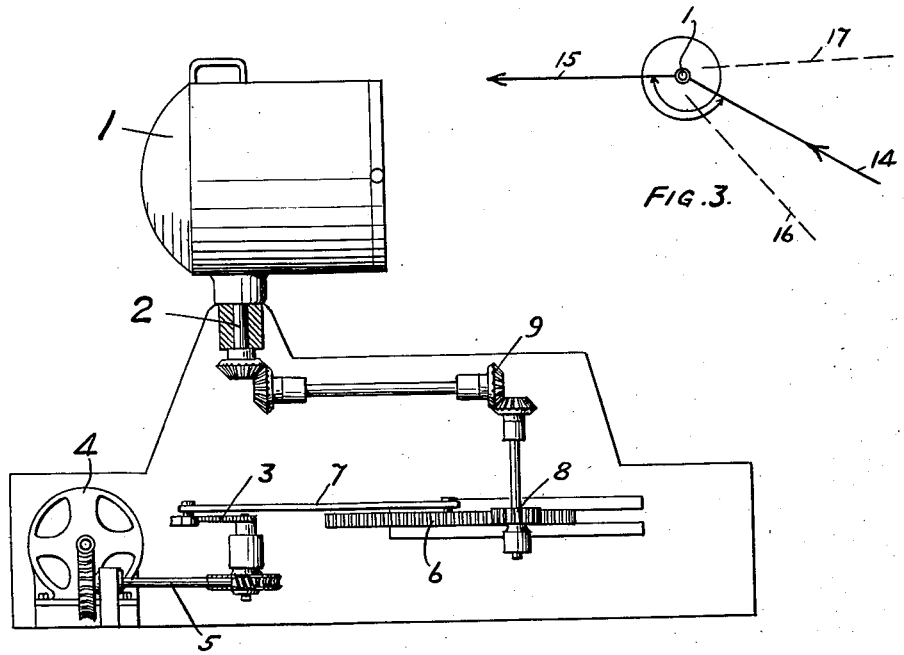
FIG. 3.
FIG. 1.
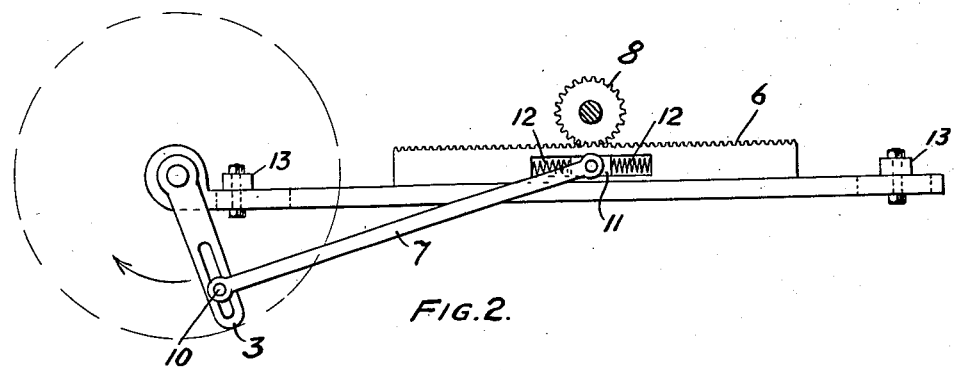
FIG. 2.
WITNESS:
INVENTOR
Edward W. Jackson
BY
Augustus B. Stoughton
ATTORNEY.

Patented Nov. 6, 1928.

1,691,011

UNITED STATES PATENT OFFICE.

EDWARD W. JACKSON, OF PHILADELPHIA, PENNSYLVANIA, ASSIGNOR TO B. B. T. CORPORATION OF AMERICA, OF PHILADELPHIA, PENNSYLVANIA, A CORPORATION OF DELAWARE.

BEACON.

Application filed January 29, 1926. Serial No. 84,540.

Objects of the present invention are to definitely mark direction or a course or courses; to locate the marked direction or course or courses; to provide simple, reliable and efficient mechanism for operating a beacon light in such a way that either or both of the foregoing objects can be accomplished; and to provide for individualizing a beacon light to distinguish it from other beacon lights.

Other objects of the invention will appear from the following description at the end of which the invention will be claimed.

The following description will be made in connection with the embodiment of the invention chosen from among other embodiments for the sake of illustration in the accompanying drawing in which—

Figure 1 is a diagrammatic view, partly in section, illustrating features of the invention.

Fig. 2 is a diagrammatic plan view of some of the parts shown in Fig. 2, and

Fig. 3 is a diagrammatic view hereinafter referred to.

In the drawing 1 is a search-light mounted to revolve about the axis 2. 3 is a crank arm shown as revolved by a motor 4 through reduction gearing 5. 6 is a rack mounted for reciprocation, and it is connected with the connecting rod 7 of the crank. 8 is a pinion meshing with the rack and it is connected with the searchlight 1 through the intervention of gearing 9. As shown the wrist pin 10 is adjustable on the crank arm, and the connecting rod 7 is connected with a block 11 slidably connected with the rack and centered by springs 12. 13 are adjustable stops for limiting the range of reciprocation of the rack.

The mode of operation may be described in connection with air planes, but the invention is applicable to other uses and purposes on both land and sea.

Rotation of the crank causes reciprocation of the rack with a motion that may be called harmonic motion and in which there is a dwell at each end of the stroke of the rack and an acceleration at the middle part of each stroke. Referring to Fig. 3, each of the lines or arrows 14 and 15 represent an airplane course. The gearing between the rack and search-light is such that the beam of the search-light coincides with the course 14 at one end of the stroke of the rack and with the course 15 at the other end of the stroke of the rack, so that there is a dwell in the movement of the beam when it coincides with or lies in the course. In an airplane approaching the beacon the beam is only made visible when directly head on, so that if a dwell in the motion of the beam is observed it is known that the airplane is on its course. If a dwell cannot be discerned in the movement of the beam, it is known that the airplane is off its course. The foregoing applies equally to an airplane approaching the beacon on either the course 14 or 15, and also to an airplane which, for example, has traversed the course 14 and is traversing the course 15. However, on the latter course the aviator must look backward. As far as has been described the course has been definitely marked but if an airplane is off the course, to one side or the other of it, it is possible by the present invention to indicate on which side of the course the airplane is located. For this purpose the beam of light is made to travel more than 360°, first in one direction and then in the other, at each successive stroke of the rack while dwelling in the course at each end of stroke of the rack. From this it results that an airplane travelling a false course indicated by the dotted line 16, will not observe the dwell in the movement of the beam which takes place in the correct course 14, but will observe two succeeding flashes of the beam from which it is known that it is on the side of the course 14 upon which the line 16 lies. If an airplane is following the false or erroneous course 17, the dwell in the movement of the beam that occurs only on the true course 14 will not be seen, but a comparatively quick single flash of the beam will be seen and will indicate that the aviator is off the course 14 to the side upon which the line 17 lies. The flash seen on the false course 17 is short because rotation of the light is comparatively fast since it is due to the movement of the rack at an intermediate portion of its travel. To individualize a beacon, the dwell in the movement of the beam on the true course may be lengthened by adjustments of the stops 13 which hold the rack whilst the crank completes a part of its revolution, the springs yielding for that purpose. The part of the revolution traversed by the crank under these circumstances is the part of the revolution nearest to the axis or line of the rack or the part where the crank and connecting rod more nearly occupy straight line position. By adjusting the wrist pin the extent to which the light is turned for each reciprocation of the rack and first in one direction and then in the other can be adjusted to suit various courses. In the case of a double ended search light the true course can be indicated as is obvious in the manner above described.

It will be obvious to those skilled in the art to which the invention relates that modifications may be made in details of construction and arrangement and in matters of mere form without departing from the spirit of the invention which is not limited to such matters or otherwise than as the prior art and the appended claim may require.

I claim:

A beacon comprising a revoluble searchlight of which the beam is constantly swept over the entire field of approach, a rack and pinion mechanism for oscillating it, a crank mechanism for reciprocating the rack, a normally centered element connected with and movable in respect to the rack and to which the connecting rod of the crank mechanism is connected, and stop means for augmenting the dwell in the motion of the rack near the ends of the strokes.

EDWARD W. JACKSON.